United States Patent [19]

Machida et al.

[11] Patent Number: 5,161,081

[45] Date of Patent: Nov. 3, 1992

[54] DISK CARTRIDGE MADE BY INJECTING MOLTEN SYNTHETIC RESIN INTO A MOLD SO THAT FLASH LINES, WELD LINES AND BURN MARKS DO NOT OCCUR

[75] Inventors: Tetsuo Machida, Miyagi; Tatsuya Yamazaki, Tokyo, both of Japan

[73] Assignee: Sony Corporation, Tokyo, Japan

[21] Appl. No.: 800,884

[22] Filed: Nov. 27, 1991

Related U.S. Application Data

[63] Continuation of Ser. No. 392,357, Aug. 11, 1989, abandoned.

[30] Foreign Application Priority Data

Aug. 13, 1988 [JP] Japan .................................. 63-202110

[51] Int. Cl.$^5$ ..................... G11B 23/033; B29C 45/44
[52] U.S. Cl. .................................. 360/133; 264/328.9; 425/542
[58] Field of Search ................. 360/133, 137; 206/444; 425/542, 567, 573, DIG. 227, DIG. 229; 264/349, 328.9, 328.12

[56] References Cited

U.S. PATENT DOCUMENTS

| | | | |
|---|---|---|---|
| 4,185,955 | 1/1980 | Holmes et al. | 264/328.12 |
| 4,510,546 | 4/1985 | Asami et al. | 360/133 |
| 4,544,977 | 10/1985 | Ozawa et al. | 360/133 |
| 4,698,714 | 10/1987 | Sugawara et al. | 360/133 |
| 4,714,973 | 12/1987 | Kato et al. | 360/133 |
| 4,738,613 | 4/1988 | Eichlseder et al. | 264/328.9 |
| 4,803,584 | 2/1989 | Doi et al. | 360/133 |
| 4,827,468 | 5/1989 | Odawara et al. | 360/133 |
| 4,866,697 | 4/1989 | Yamaguchi et al. | 360/133 |
| 4,880,587 | 11/1989 | Eichlseder et al. | 264/328.9 |
| 4,918,559 | 4/1990 | Maruyama et al. | 360/133 |

Primary Examiner—John H. Wolff
Assistant Examiner—Craig A. Renner
Attorney, Agent, or Firm—Hill, Van Santen, Steadman & Simpson

[57] ABSTRACT

Molten resin is ejected from the gate provided in the wall of a mold, which corresponds to the face of the head insertion opening of a disk cartridge, so that the molded half of the disk cartridge has scarcely any defect in the surface thereof.

1 Claim, 5 Drawing Sheets

DISK CARTRIDGE MADE BY INJECTING MOLTEN SYNTHETIC RESIN INTO A MOLD SO THAT FLASH LINES, WELD LINES AND BURN MARKS DO NOT OCCUR

This is a continuation of application Ser. No. 392,357, filed Aug. 11, 1989, now abandoned.

BACKGROUND OF THE INVENTION

1. Field of the Invention

This invention relates to a disk cartridge rotatably accommodating a disk-like recording medium, such as a floppy disk, and to an equipment for molding the half of a disk cartridge from synthetic resin.

2. Description of the Prior Art

As to inventions of a 3½ inch floppy disk, several applications have been already granted to the applicant for this invention under U.S. Pat. Nos. 4,445,155, 4,445,157, 4,510,546, 4,517,617, 4,544,977, and 4,589,105. The 3½ inch floppy disk disclosed in those applications is shown in FIGS. 3A and 3B.

In the drawings, a pair of upper and lower halves 1 are made of synthetic resin through an injection molding, and engaged with or welded to each other to form a cartridge 2 in which a 3½ inch floppy disk 3 made of magnetic sheet is rotatably accommodated. That is, each of the upper and lower halves 1 has a plate portion 1a and a rib portion 1b perpendicularly extending from the outer periphery of the plate portion 1a, and the free ends of the rib portions 1b of the upper and lower halves 1 are engaged with or welded to each other.

A rectangular head insertion opening 4 is provided in the center of one end of each of the plate portions 1a, and opened and closed by a shutter 5 which has a U-shaped section, and is slidably secured to the outer face of the cartridge 2. Provided in the center of the plate portion 1b of the lower half 1 is a circular opening 7 in which the core 6 of the floppy disk 3 is loosely fitted.

When above half 1 is made through the injection molding, it is well-known that molten resin is ejected from, for example, four gates 11 of about 1 mm in diameter which are disposed in the wall of a mold so as to correspond to the four corners of the plate portion 1a of the square half 1 as shown in FIG. 4, and as shown in FIG. 5A, the molten resin 14 is injected into the cavity 13 of the mold 12 in a direction perpendicular to the plate portion 1a of the half. In FIG. 5A, reference numerals 15 and 16 denote an injection head and a runner, respectively.

However, the flows of the molten resin ejected in directions of respective arrows shown in FIG. 4 from the four gates 11 collide with one another, so that various defects, such as weld lines 17, burn marks, uneven gloss 18 and the like are often found in the surface of the half 1 after molding. Further, as shown in FIG. 5B, traces 21, such as recess 19 formed by the injection head 15, and a small projection 20 formed due to tearing off the resin and the like are left in the surface of the half 1 after molding.

In addition, as the thickness of the plate portion 1a of the half 1 is less than 1 mm, and the molten resin is not only ejected from the gate 11 of about 1 mm in diameter, but also injected in the direction perpendicular to the plate portion 1a of the half 1, the time required to fill the cavity 13 with the molten resin is protracted due to the pressure loss caused by the gate 11, and as the result, much time is required to mold the half 1. If the injection pressure of the molten resin is raised, many flashes are apt to be formed in the face of the mold.

OBJECTS AND SUMMARY OF THE INVENTION

Accordingly, it is an object of the present invention to provide a disk cartridge in which a plurality of flows of molten resin are injected into the cavity of a mold without collision with one another, while the half of a disk cartridge is molded, and thereby, the appearance of the molded half is much improved.

Another object of the invention is to provide a disk cartridge in which molten resin is injected into the cavity of a mold in parallel with the faces of the cavity which correspond to the upper and lower faces of the plate portion of the half which is a part of a disk cartridge, while the half is molded, and thereby, time required to fill the cavity with the molten resin is shortened, and flashes are not found in the face of the mold due to the low pressure of the ejected molten resin.

A further object of the invention is to provide an equipment for molding the half of a disk cartridge, in which a gate is arranged to eject molten resin through such a wall provided in a mold as to form the face of an head insertion opening which exists in the half of a disk cartridge, and such a wall of the cavity of the mold as to form the plate portion of the half, within which the head insertion opening exists, is in alignment with the directions of the flows of molten resin which are injected into the cavity, and thereby, any defect, such as weld line, burn mark, uneven gloss or the like is scarcely developed, and also the trace of the gate is not found.

A still further object of the invention is to provide an equipment for molding the half of a disk cartridge, as aforesaid, in which the gate is provided in a slide core movable in a direction perpendicular to a wall of the cavity as to form the plate portion of the half, so as to have synthetic resin shear between the gate and the half molded in the cavity, and thereby, any trace of the gate is not left in the surface of the half.

In accordance with an aspect of this invention, a disk cartridge has a substantially square case in which a disk is rotatably accommodated, and which comprises an upper half and a lower half; an even plate portion of the half which is made of synthetic resin; a head insertion opening provided in the plate portion of the half; and a face of the head insertion opening which connects the upper face to the lower face of the plate portion of the half; wherein when the half is molded from synthetic resin, a gate is provided in the wall of a mold, which corresponds to the face of the head insertion opening of the half, and molten resin is injected in parallel with the wall of the cavity of the mold, which corresponds to the upper and lower faces of the plate portion of the half.

In an equipment for molding the half of a disk cartridge, the equipment comprises a mold for molding the half from synthetic resin, the half having a substantially even plate portion and a head insertion opening provided in the plate portion; a cavity provided within the mold and having even faces within the wall thereof, so as to mold the plate portion of the half; an injection head of the mold provided across the cavity of the mold so as to mold the head insertion opening of the half; and a gate provided in the outer periphery of the injection head to enable molten resin to be injected into the cavity in parallel with the even faces of the cavity.

The above, and other objects, features and advantages of this invention, will be apparent in the following detailed description of an illustrative embodiment thereof which is to be read in connection with the accompanying drawings wherein like reference numerals identify the corresponding parts in the several views.

DETAILED DESCRIPTION OF A PREFERRED EMBODIMENT

Figure 1:
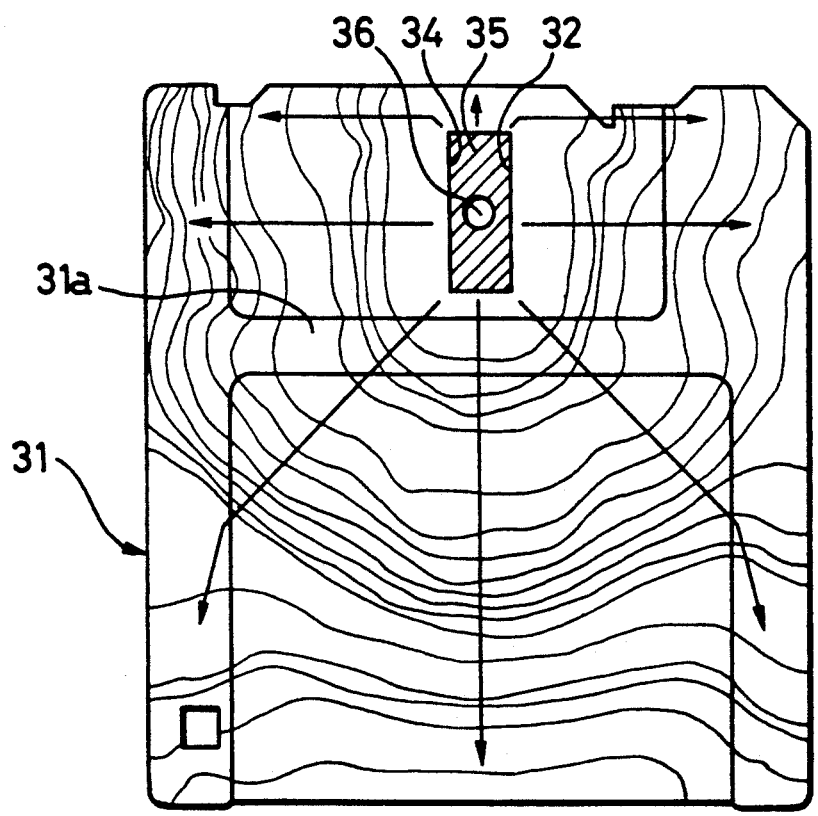
FIG. 1 is a plan view of the half of a disk cartridge according to an embodiment of this invention.

Referring to the drawings in detail, and initially to FIG. 1 thereof, it will be seen that the half 31 of a disk cartridge has an even plate portion 31a and an elongated, for example, rectangular head insertion opening 32 located in the center of one end of the plate portion 31a. When the half 31 is made, molten resin is ejected through the wall of a mold which corresponds to the face of the head insertion opening 32.

Figure 2A:
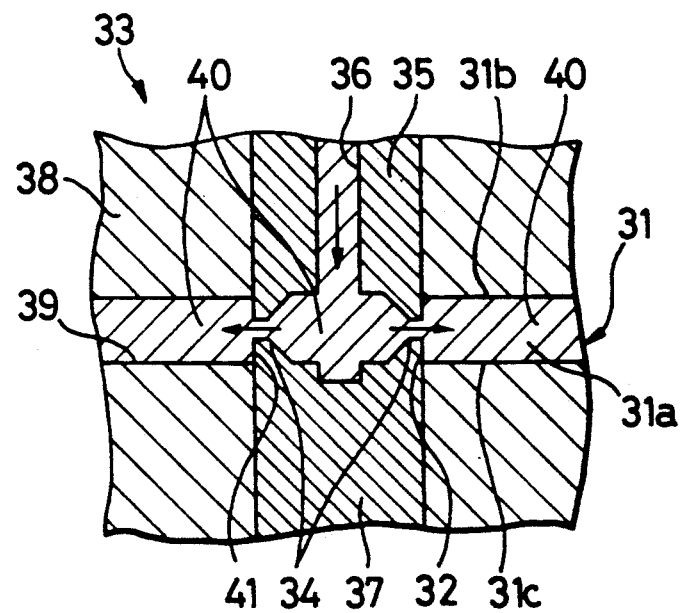
FIGS. 2A and 2B are fragmentary sectional views of important parts of an injection molding equipment according to an embodiment of this invention.

That is, in an equipment 33 for molding the half 31 from synthetic resin shown in FIG. 2A, an injection head 35 of a mold 38, which is formed into a slide core 37, is arranged to make the head insertion opening 32, and a gate 34 of the injection head 35 is disposed at the end of a runner 36 which is formed in the slide core 37. The gate 34 extends in a line substantially all over the periphery of the wall of the injection head 35 which corresponds to the face 41 of the head insertion opening 32. The face 41 connects the upper face 31b of to the lower face 31c of the plate portion 31a of the half 31.

The molten resin is radially ejected from the gate 34, and injected into the cavity 39 of the mold 38 in parallel with the walls of the cavity 39 which correspond to the faces 31b and 31c of the plate portion 31a of the half 31, so as to fill the cavity 39 therewith. After cooling, the half 31 is molded.

Figure 2B:
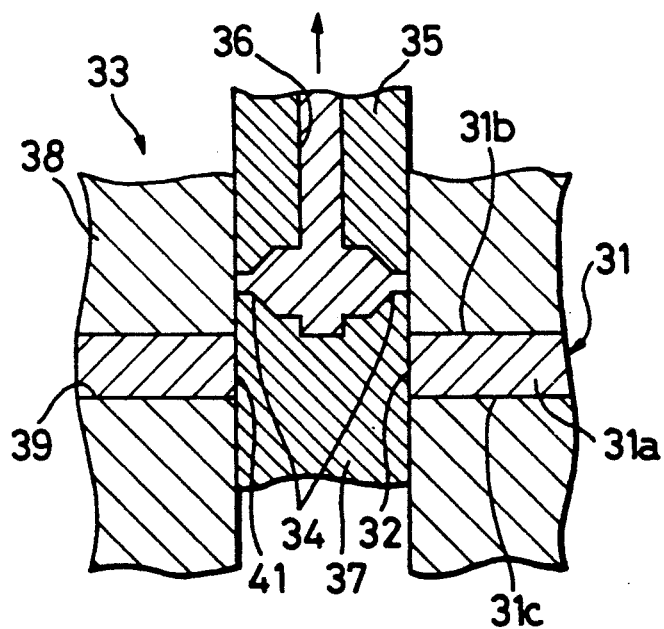
Figure 2C:
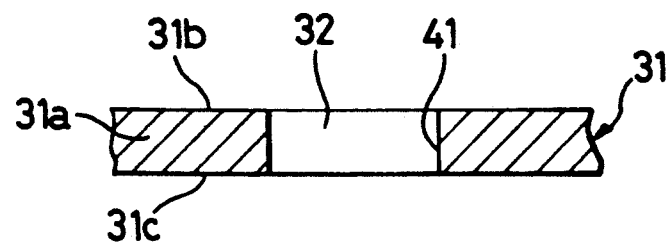
FIG. 2C is a fragmentary sectional view of the half after molding shown in FIG. 2B.
Figure 3A:
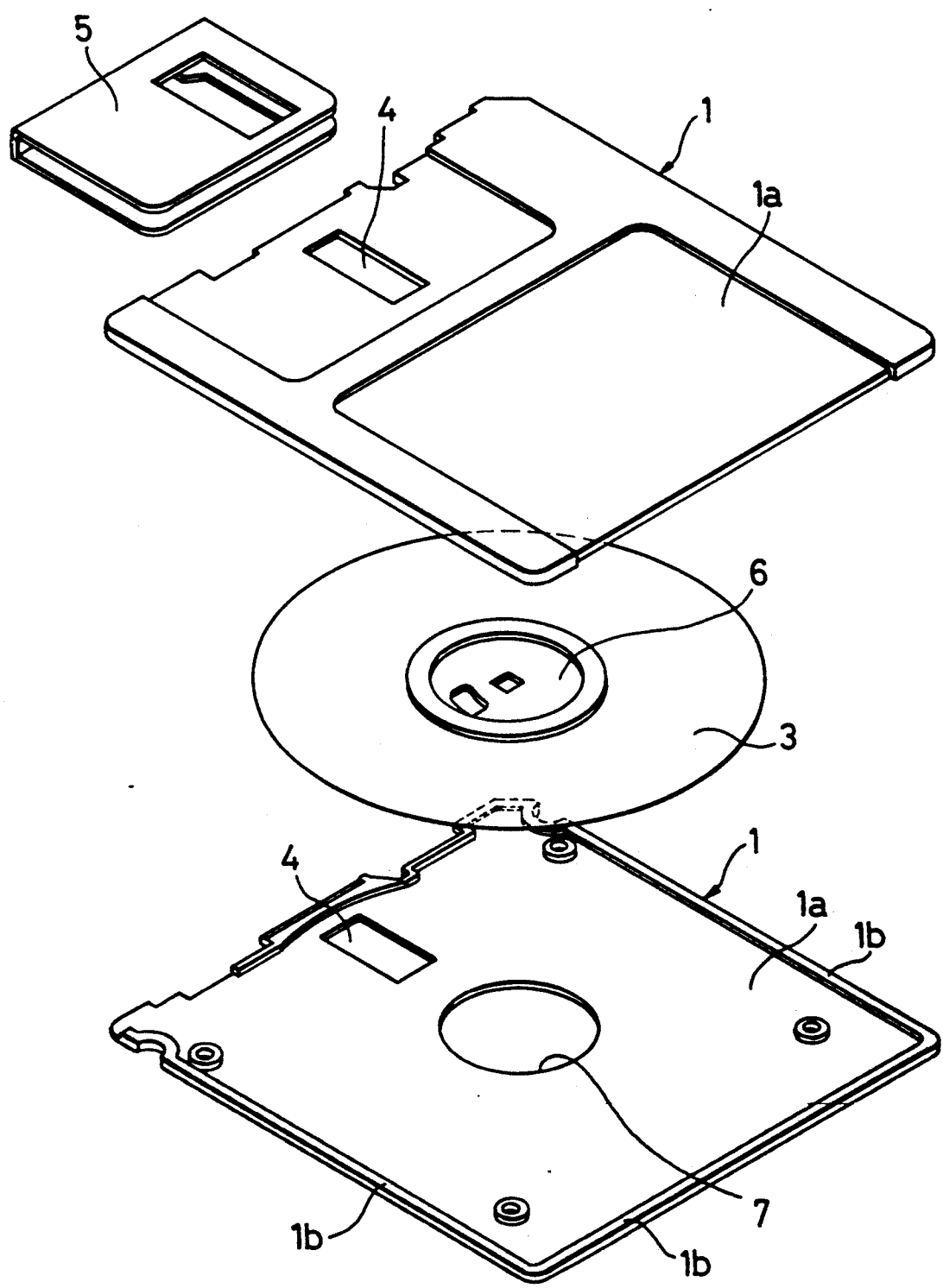
FIGS. 3A and 3B are an exploded, perspective view and an assembled, perspective view of the disk cartridge of FIG. 1, respectively.
Figure 3B:
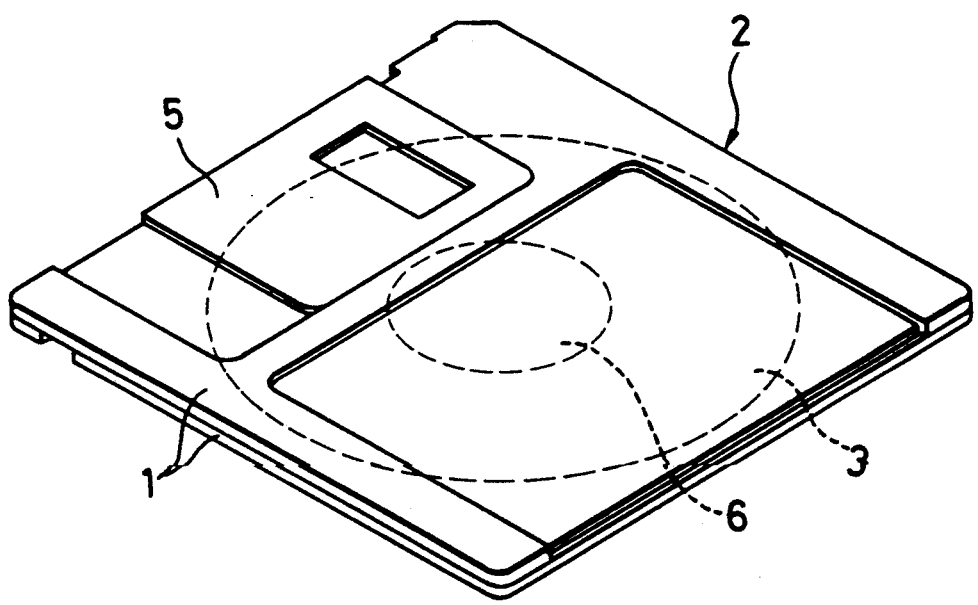

Then, the side core 37 is moved in a direction perpendicular to the plate portion 31a of the half 31 as shown in FIG. 2B, so that there is no trace of the gate 34 left in the face 41 of the head insertion opening 32 as shown in FIG. 2c.

As the molten resin 40 is ejected from the wall of the mold 38 which corresponds to the whole face of the head insertion opening 32, and divergently injected into the cavity 39 as indicated by arrows in FIG. 1, the flows of the molten resin do not collide with one another within the cavity 39, so that the defects, such as weld lines, burn marks, uneven gloss and the like are not easily formed in the face of the molded half 31.

Figure 4:
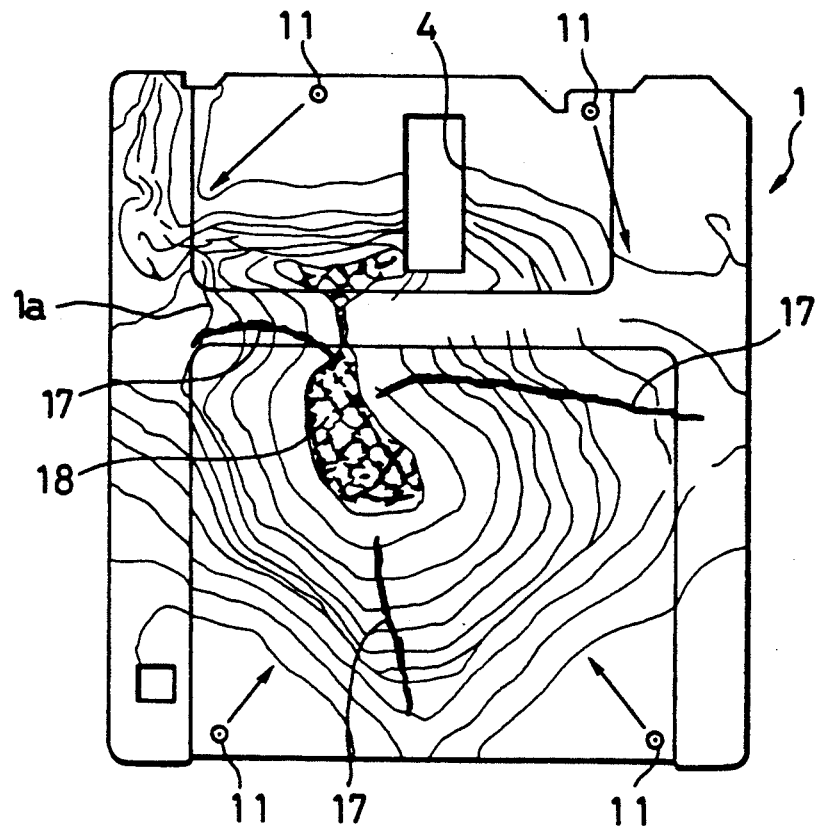
FIG. 4 is a plan view of the half of a conventional disk cartridge.
Figure 5A:
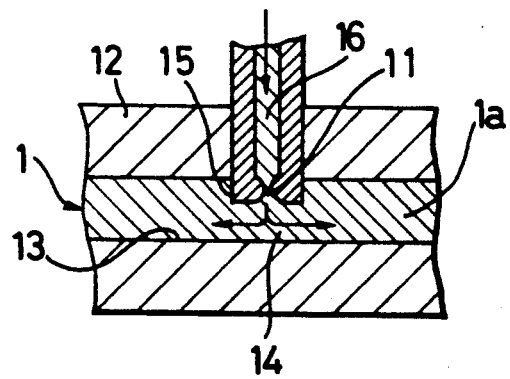
FIG. 5A is a fragmentary sectional view of important parts of a conventional injection molding equipment.
Figure 5B:
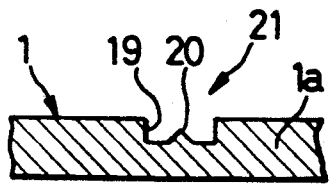
FIG. 5B is a fragmentary sectional view of an important part of the half of a conventional disk cartridge after molding.

Moreover, as the length of the gate 34 can be made large enough so as to correspond to that of the whole face 41 of the head insertion opening 32. As compared with the well-known gate 11 of small diameter shown in FIG. 4, the pressure loss of the molten resin 40 incurred at the gate 34 is small and as the result, the time required to fill the cavity 39 with molten resin is shortened. The half 31 can be made in a short time. In addition, as it becomes possible to inject the molten resin 40 into the cavity 39 under a low pressure, flashes are not easily formed in the face of the mold 38.

According to the result of a comparative test shown in Table 1, the time required to fill the cavity 39 with molten resin 40 was shortened to about one third of the conventionally required time, and also, the ejection pressure at the time of injecting molten resin 40 into the cavity 39 was decreased to about one half of the conventionally required pressure when the injection molding equipment 33 of this invention is used.

Having described an illustrative embodiment of this invention with reference to the accompanying drawings, it is to be understood that the invention is not limited to that precise embodiment described, and that various changes and modifications may be effected therein by one skilled in the art without departing from the scope or spirit of the invention as defined in the appended claims.

The invention is also applicable to such a half of disk cartridge as to accommodate various kinds of disk-like recording medium.

TABLE 1

| | Time required to fill the cavity with molten resin (sec) | The maximum of pressure required to inject molten resin into the cavity (kgf/cm$^2$) |
|---|---|---|
| The half of this invention | 0.1 | 150 to 300 |
| A conventional half | 0.35 | 450 |

What is claimed is:

1. A product by process comprising a disk cartridge having:

a substantially square case in which a disk is rotatably accommodated, and which comprises an upper half and a lower half, each of said upper and lower half comprising:

a planar plate portion with outer rib portions made of synthetic resin, having an upper surface and a lower surface;

a head insertion opening which extends completely through said planar plate portion and located such that it does not extend to edges of said planar plate portion;

said head insertion opening enclosed by a surface which connects said upper surface to said lower surface of said plate portion; and said planar plate portion made by a process wherein it is molded in a planar cavity of a mold from molten synthetic resin, a gate is provided in said mold which has the same dimensions as said head insertion opening and which corresponds to the location of the head insertion opening, and molten resin is injected through said gate into said cavity from said head insertion opening such that said molten resin flows from said gate outwardly in all directions and with a thickness of said planar plate portion parallel with said upper and lower surfaces of said planar plate portion to outer edges of said mold without formation of flash lines, weld lines, and burn marks.

* * * * *